United States Patent [19]

Lehman

[11] 4,378,491

[45] Mar. 29, 1983

[54] OPTICAL APPARATUS FOR SENSING INFORMATION FROM A PHONOGRAPH RECORD FOR CONTROLLING SPACING AND TRACKING OF THE PICK-UP RELATIVE TO THE RECORD

[76] Inventor: Thomas F. Lehman, 1102 Ashbury, Olathe, Kans. 66061

[21] Appl. No.: 228,609

[22] Filed: Jan. 26, 1981

[51] Int. Cl.³ .............................................. G11B 7/08
[52] U.S. Cl. ................................... 250/204; 250/201; 369/18; 369/45
[58] Field of Search ............... 250/201, 204, 208, 209, 250/234; 369/18, 44–46, 111–112, 120–121; 358/128.5

[56] References Cited

U.S. PATENT DOCUMENTS

| | | | |
|---|---|---|---|
| 3,992,593 | 11/1976 | Heine | 369/18 |
| 3,997,715 | 12/1976 | Elliot | 250/201 X |
| 4,110,607 | 8/1978 | Honjo et al. | 250/201 |
| 4,123,652 | 10/1978 | Bouwhuis | 250/204 |
| 4,142,098 | 2/1979 | Korpel | 250/201 X |
| 4,290,132 | 9/1981 | Kotaka | 369/45 |

Primary Examiner—David C. Nelms
Assistant Examiner—Edward P. Westin
Attorney, Agent, or Firm—Schmidt, Johnson, Hovey & Williams

[57] ABSTRACT

A method and apparatus employing optical type techniques are provided for use in reliably sensing the juxtapositional relationship between successively relevant portions of an object and a sensing unit that are relatively movable, in accurately maintaining a predetermined juxtapositional relationship between such portions of the object and the sensing unit during relative movement therebetween, and, when appropriate to the application, in also faithfully sensing other information carried by such portions of the object. The method and apparatus are characterized by eliminating any need for mechanical engagement between the sensing unit and the portions of the object to which the sensing unit responds and by utilizing only optical type coupling between such portions of the object and the sensing unit for the transfer of all information to be acquired by the sensing unit from the object. An important and currently preferred application of the method and apparatus, in which both positional and other information are sensed, is in playing ordinary phonograph records without inducing wear thereto in the course of sensing the recorded information. In the context of the mentioned application, both information for controlling the juxtapositional relationships between the record and the sensing unit with respect to both spacing and groove tracking and information with respect to the recorded audio material are sensed. In other contemplated applications, the sensing of only that information needed for controlling juxtapositional relationships may be desired, or the other information to be sensed may represent digitally encoded data, etc.

6 Claims, 7 Drawing Figures

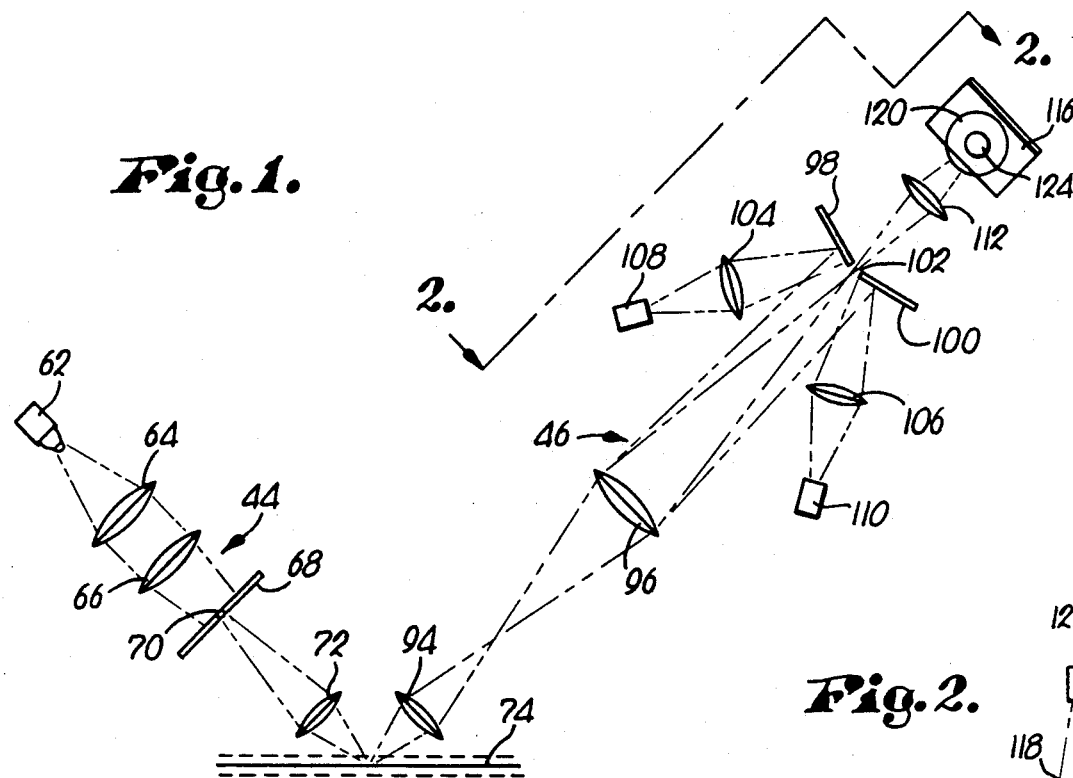
Fig. 1.
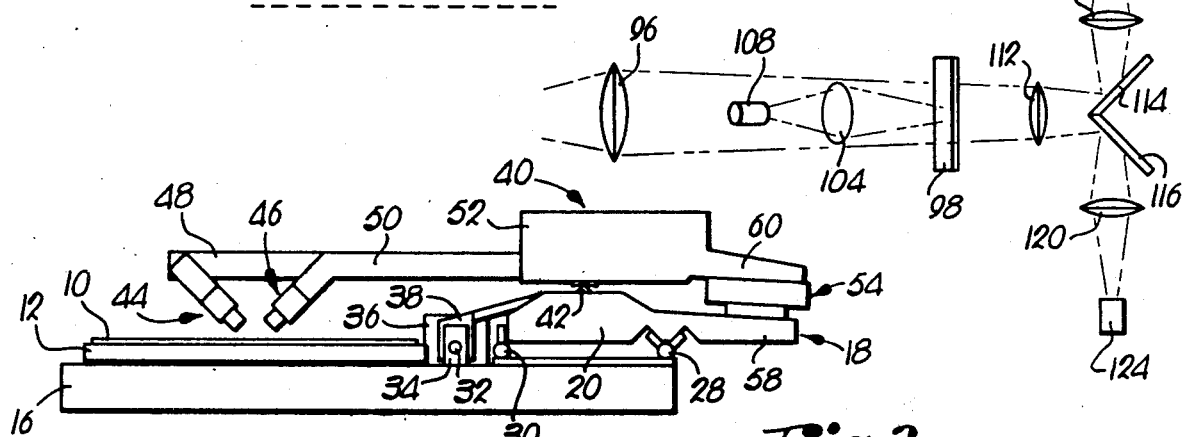
Fig. 2.
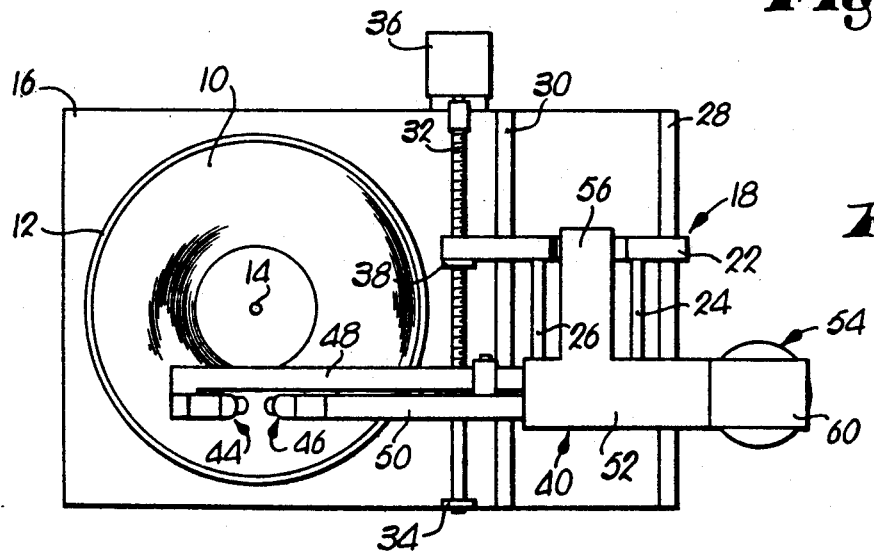
Fig. 3.
Fig. 4.

Fig.6.

| Groove and Slit Image On Dividing Mirrors | Image To Low Photo Cell | Image To High Photo Cell | Image To Right PMT | Image To Left PMT |
|---|---|---|---|---|
| 1A (185, 196, 198, 188, 186, 190) Arm At Proper Height | 1B | 1C | 1D | 1E |
| 2A Arm Too High | 2B | 2C | 2D | 2E |
| 3A Arm Too Low | 3B | 3C | 3D | 3E |
| 4A Arm Off Center To The Right | 4B | 4C | 4D | 4E |
| 5A Arm Off Center To The Left | 5B | 5C | 5D | 5E |

OPTICAL APPARATUS FOR SENSING INFORMATION FROM A PHONOGRAPH RECORD FOR CONTROLLING SPACING AND TRACKING OF THE PICK-UP RELATIVE TO THE RECORD

BACKGROUND OF THE INVENTION

1. Field of the Invention

This invention relates broadly to an improved method and apparatus employing optical type techniques for use in sensing and controlling juxtapositional relationships between an object and a sensing means (or structure with which the latter is associated) during relative movement therebetween and, when desired, also concurrently sensing other information (such as audio material, digitally encoded data, or the like) which is carried by the object.

In a more specific context, the invention will be illustrated and explained with particular reference to my currently preferred application thereof involving the precision play-back of audio material recorded on ordinary, grooved phonograph records without causing wear to the latter from any mechanical engagement between the pick-up or sensing means and the information carrying portions of the record. Other likely applications for the invention or significant parts thereof should become apparent to those skilled in the art, with reference to their particular needs or interests, from the disclosure herein of my own currently preferred application of the invention and the other comments which follow regarding its adaptability for exemplary other purposes.

2. Description of the Prior Art

The wear problem occasioned by conventionally sensing audio information recorded along the spiral groove of ordinary phonograph records (in the form of undulations in one or more of the longitudinal wall surfaces of the groove) by means of a "needle" riding in and mechanically engaging the groove (so as to be vibrated by the mentioned undulations at frequencies for reproducing the recorded sounds) has long been recognized. Repeated "playing" of such a record by means of a "needle" type pick-up inherently results in cumulative wearing away of portions of the recorded undulations, as well as possible and typical formation of false undulations, causing corresponding loss of fidelity in reproducing the audio information originally recorded and the insertion of various types of "noise". This problem has been especially critical with respect to the preservation of rare records for which replacements can no longer be obtained, but in general has affected all users of phonograph records of all kinds, who are naturally desirous of continued fidelity of reproduction of the recorded material over often substantial periods of use.

Much effort has been expended in another direction to lessen the amount of wear resulting from "needle" to record contact by developing more sensitive pick-ups that require a lesser force of mechanical engagement of the "needle" with the record, but the progress realized along those lines inevitably has provided only a partial improvement and is incapable of achieving a full solution to the problem, since wear and its consequences will continue on an at best retarded basis as long as the information sensing method employed involves moving mechanical engagement between a "needle" and the information carrying groove surfaces of the record.

The earliest suggestion of the use of any type of optical technique in the sensing of information from phonograph records, of which I am aware, is found in the Friebus U.S. Pat. Nos. 1,916,973, 1,877,447 and 1,891,227, of which the last two apparently represent intended improvements or extensions of the first. In U.S. Pat. No. 1,916,973, the problem of wear upon the record caused by the "needle" was mentioned in passing (although the problems primarily sought to be overcome apparently were the frequency limitations caused by the mechanical inertia of the "needle" load and the tendency of the type of "needles" then in use to themselves wear in a manner causing distortion of reproduction), and it was proposed to sense the sounds recorded as undulations in a wall of the record groove by means of an optical microscope and an associated photo-electric cell for detecting the flickering of light reflected from an internal wall of the groove caused by the undulations recorded therein; however, that patent appears entirely silent as to how the microscope might either be made to accurately track with the spiral groove of the record during rotation of the latter or be made to maintain a height or spacing from the typically varying level of the groove of an ordinary record upon a turntable for keeping the microscope in focus upon the wall of the groove from which variations in the intensity of reflected light due to the recorded undulations were to be sensed, both of which would have been critically essential to accurate or even practical operation of the arrangement proposed. In the latter respect, U.S. Pat. Nos. 1,877,447 and 1,891,227, which matured from applications filed after that from which U.S. Pat. No. 1,916,973 resulted, both utilize a guide pin riding in the information carrying groove of the record for groove tracking purposes and the bottom of a housing associated with the optical pick-up assembly riding on the grooved surface of the record for height controlling purposes. Thus, the mentioned Friebus patents, although neither providing nor seemingly even seeking a solution to the problem of eliminating wear upon records from moving mechanical engagement with the information carrying portions thereof, did suggest the possibility of employing an optical technique involving the sensing of the intensity of light reflected from a portion of a phonograph record carrying recorded information in the form of surface undulations as a means of sensing such recorded information.

Shortly after the mentioned Friebus U.S. Patents, the Williams U.S. Pat. No. 1,917,003 and the Hammond U.S. Pat. No. 1,967,882 proposed generally similar systems for optically sensing recorded information from phonograph records or the like based upon the intensity of light reflected from the recording grooves, except that the Williams and Hammond patents recognized the desirability of not having the guide pin used for tracking and height control purposes ride in the information carrying groove of the record and proposed the provision of special records having a separate guide groove for cooperating with the guide pin (the Williams patent also proposed the alternative of providing rollers for respectively engaging the surface and the edge of an ordinary record for height and tracking control purposes respectively). Thus, the Williams and Hammond patents show early appreciation of the importance both of avoiding wear-producing physical engagements with information carrying portions of records and of providing height and tracking control in systems where recorded information is to be sensed optically in terms of reflected light variations, but both proposed relatively crude mechanical means for accomplishing those functions that are of limited applicability or practicality.

The next development in the art of possible interest, of which I am aware, was the system for reproducing recorded sounds from grooved cylindrical records suggested by the Alexanderson U.S. Pat. No. 1,978,183. Although the system proposed by that patent does not provide variable height or spacing control between the record and the optical sensor for light reflected from the information carrying portions of the record (as I have found it essential to do for really accurate or practical reproduction with ordinary phonograph records or the like subject to non-planarities due to warping or manufacturing tolerances), such system does suggest splitting the reflected light into two components respectively directed to separate photo-electric cells, with the intensities of reflected light sensed by both cells jointly being cumulatively utilized as the achieved sensing of the information recorded on the track, and with the intensities respectively sensed by the two cells separately being utilized to control a device for axially shifting the cylindrical record to maintain tracking between the helical path of recorded information on the cylindrical record and a reflected light pick-up assembly being continuously moved along the length of the cylindrical record by a lead screw.

Following the Alexanderson patent, there appears to have been a virtual hiatus of approximately 30 years in the development of relevant systems or techniques, insofar as I am aware, during which the attention of those working in the field was apparently directed toward the previously mentioned goal of seeking merely an inherently partial solution to the problem of record wear due to "needle" contact therewith by improving the sensitivity of the transducer to which the "needle" was mechanically coupled and the mountings for the "needle" carrying pick-up head to permit the force of engagement of the "needle" with the information bearing portions of the record to be at least reduced.

The Rabinow U.S. Pat. No. 3,138,669 marked an apparent renewal of interest in the use of optical techniques for sensing recorded information from a phonograph record or the like, as well as a further attempt to suggest apparatus that might be practical for that purpose. That patent, like the much earlier Alexanderson patent, recognized the desirability of avoiding a guide pin of the sensor unit riding in a groove in the record for controlling tracking between an optical pick-up for recorded information and the groove or zone of the record carrying the recorded information to be sensed, and also sought to achieve such tracking function through optical means, namely, a light source which scanned continually back and forth across the information carrying groove, with the intensity of reflected light being sensed providing a component characteristic of the scanning reaching one edge of the groove for reversing the direction of scanning, and with the intensity sensings being essentially averaged to control the speed of a lead screw for maintaining tracking between the reflected light sensor and the groove.

The subsequent developments having some possible relevance, of which I am aware, appear to have concerned themselves with diverse miscellaneous aspects of systems employing optical techniques for sensing recorded information, but not to have really advanced the state of the art in any basic way sufficient to render the use of such techniques truely practical in any general sense.

The Dahlen U.S. Pat. No. 3,452,163 is of broad background interest as an illustrative confirmation that the skill of the art includes the ability to configure light paths to better satisfy space minimizing or other collateral requirements by means of lenses, mirrors, prisms, fiber optic rods and other known optical components, and the system proposed by that patent employs a pair of fiber optic rods with respectively associated sensors for separately sensing light reflected from the opposite sides of a recording groove, in order to handle stereo as well as monaural types of music bearing records, as well as to utilize the relative intensities of light reflected from the respective sides of the groove to provide a control signal for groove tracking purposes.

The Laue U.S. Pat. No. 3,666,896, the Zorn U.S. Pat. No. 3,975,630 and the Laub U.S. Pat. No. 4,044,378 further illustrate conventional techniques for configuring light paths with optical components. The system of the Laue patent employed a sensing "needle" riding in the information carrying groove, while those of the Zorn patent and the Laub patent utilized optical techniques for controlling tracking of the sensor with a zone of recorded information on the record. The Zorn patent also involved the employment of a non-grooved type of record on which information was recorded in the form of undulations or lateral displacements along the edge boundaries of a track or zone having different optical properties than the regions laterally adjacent thereto, although the system of that patent also employed laser type radiations.

The Mullin U.S. Pat. No. 4,079,261 confirms the continuing tendency in this art to rely upon mechanical means movably engaging the record for supporting an optical sensor in spaced relationship to the information carrying portions of the record by employing a wheel riding on the surface of the record for such purpose.

Insofar as I am aware, therefore, the present state of the art has heretofore failed to provide any really practical method or apparatus for the accurate and reliable sensing of information recorded in the form of undulations or lateral displacements of the boundaries of recording grooves or other information carrying zones wherein the sensing of not only the recorded information, but also of other information for controlling tracking and height, are derived entirely by optical techniques and without resort to some form of running engagement between parts associated with the sensor and portions of the record itself. Without eliminating such running engagements for controlling the height or spacing of the sensing unit relative to the information carrying portions of the record, the specific objectives of my preferred application simply cannot be realized. It is believed fair to further conclude that the systems previously employed for optical sensing of recorded information, in failing to provide other than relatively crude mechanical means for controlling height or spacing of the sensor relative to the recorded information being sensed from a record, and by failing to recognize that optical techniques could also be employed for that purpose, have thereby precluded such systems from achieving any full solution to the problem of eliminating wear while at the same time providing accurate fidelity of reproduction of recorded information, which inherently requires precise and typically variable positioning of the sensor relative to the record in order to maintain the required focused relationship with the information carrying area of a record characterized by typical warping, distortions or other lack of ideal planarity.

SUMMARY OF THE INVENTION

This invention completely eliminates the problem of wear upon records or the like from mechanical contact of parts associated with the sensor unit with the record in order to provide height or tracking control by accomplishing the sensing of all required control information, as well as the desired recorded information, in a manner employing optical rather than mechanical techniques. Moreover, the use of optical techniques for performing all of such functions results in significantly increased accuracy and fidelity of performance by the over-all system.

Broadly, the invention involves directing optically responsive radiations (i.e., radiations of type amenable to transmission, reflection, focusing and the like by optical type components such as lenses, apertures, mirrors and the like or their equivalents) onto portions of the record including a relatively small and preferably symmetrical area thereof containing a short stretch of the recording groove or other information carrying zone and regions of the record laterally adjacent such stretch, receiving radiations reflected from parts of such area (i.e., the regions laterally adjacent the stretch of the groove in the case of ordinary phonograph records) along a predetermined path preferably having an acute angle of incidence with the surface of such regions, optically splitting the beam of such reflected radiations into three components representing light reflected respectively from parts of the mentioned area proximate one extremity of the stretch, parts of such area proximate the other extremity of the stretch and parts of the area adjacent a longitudinally central section of the stretch, converting intensities of the first two of such components into electrical signals for controlling the height or spacing of the sensor from the area of the record being sensed, splitting the third of the mentioned components of the radiation reflected from such area into two components respectively representing radiations reflected from the regions on opposite sides of the stretch, converting a portion of the intensities of such side components of the reflected radiations into electrical signals for controlling the tracking of the optical sensing unit with the information carrying groove, and converting a portion of the intensities of such side components of the reflected radiations into electrical signals representative of information recorded in the form of undulations or lateral displacements of the boundaries between the stretch of the recording groove within the area being sensed and the regions of the record surface laterally adjacent thereto (at least one of such side components being so converted where the same information is recorded by symmetrical undulations of both side walls of the groove as for monaural sound, and each of such side components being separately so converted where different information is recorded by independent undulations in the respective side walls of groove as for stereo sound), it being understood, of course, that during sensing of the recorded information the record will be relatively rotating (or otherwise translating in the case of a strip-like medium) relative to the optical sensing unit.

Further details of implementation of the invention will be hereinafter described with reference to my currently preferred embodiment and application of the invention to the sensing of recorded audio information from an ordinary phonograph record, and a number of equivalent modifications of certain of such details will be suggested or become apparent to those skilled in the art as appropriate for other applications or where the object being sensed is other than a conventional phonograph record.

BRIEF DESCRIPTION OF THE DRAWINGS

In the drawings:

FIG. 1 is a largely schematic, side elevational view of the optical sensing unit and radiation source unit of my apparatus showing their general relationship during operation to the surface of a portion of a phonograph record from which information is being sensed, it being noted that such figure is intended primarily to depict the identity and general relationships between the things shown therein, rather than to represent even approximately the actual scale of such things or the dimensions involved in their relationships;

FIG. 2 is a fragmentary, schematic view of a portion of the optical sensing unit viewed from along the line 2—2 in FIG. 1;

FIG. 3 is a side elevational view showing the primary components of a turntable for supporting and rotating a record from which information is to be sensed and the "tone arm" for supporting the radiation source unit and the optical sensing unit on the turntable;

FIG. 4 is a top plan view of the turntable and "tone arm" shown in FIG. 3, in which certain details of the mounting relationship therebetween are further shown;

FIG. 6 is a chart to facilitate understanding of the portions of the area being sensed which are relevant to various functions of the apparatus, as well as the reflectivity configurations thereof under various operating conditions; and FIG. 7 is a schematic, block diagram type depiction of the electrical portions of the apparatus.

DESCRIPTION OF THE PREFERRED EMBODIMENT

Figure 5:
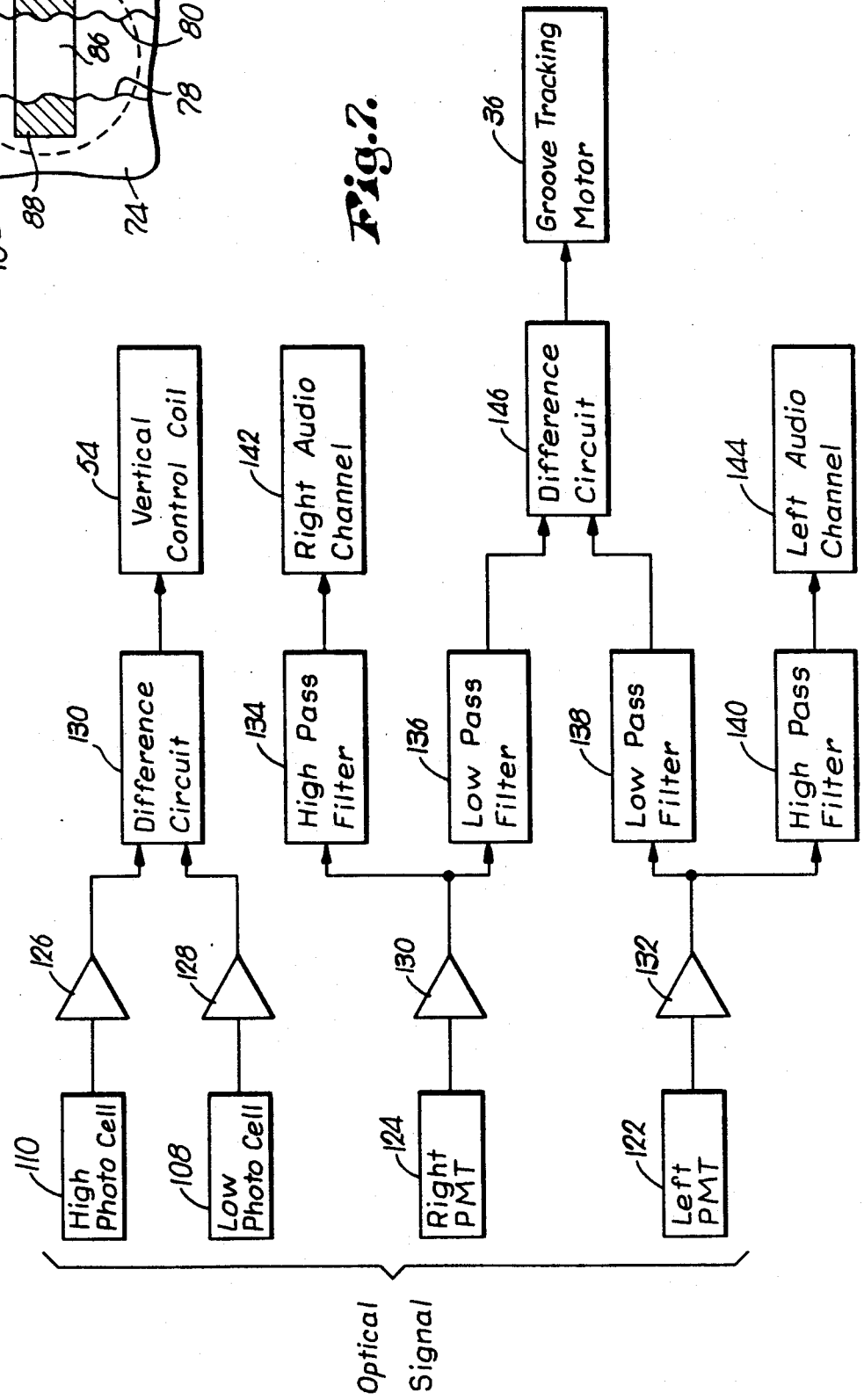
FIG. 5 is a schematic depiction of a portion of the surface of an ordinary record including a symmetrical area to which radiations are being applied, which depicts the radiation reflecting characteristics of a stretch of the information recording groove and regions of the record laterally adjacent thereto.

As previously indicated, the invention will be herein explained for illustrative purposes with particular reference to the application thereof currently of primary interest to me, namely, the "playing" of music conventionally recorded in the groove of ordinary disc type phonograph records (i.e., records employing the common "side out" recording technique in which the information is recorded in the form of undulations in the side walls of the groove and successive convolutions of the groove are separated by narrow, typically flat regions of greater effective optical reflectivity from above the record than the side walls of the groove, as contrasted with records employing the now long obsolete "hill and dale" recording technique in which the depth of the groove is undulated or with certain of the records employing a so-called "over cut" recording technique in which successive convolutions of the groove may be so overlapped as not to provide regions of greater reflectivity than the grooves therebetween) without any wear whatsoever to any portion of the face of the record from any mechanical contact therewith by the pick-up or sensor unit or by any "needle", roller or other structure provided for either sensing or sensor control purposes, and with even more specific reference to my currently preferred method and apparatus for practicing the invention in connection with that application.

As initial background for consideration of the more detailed aspects of such preferred application and embodiment of the invention, however, it should be helpful to note certain characteristics of ordinary phonograph records. The elongate, spiralled, recording groove of such records is generally triangular in transverse cross-section with the side walls thereof converging at approximately a right angle. The lateral spacing between adjacent convolutions of the groove is approximately 0.006 inch and the width of the groove at the edges thereof intersecting the surface of the record will vary from about 0.001 inch to about 0.0025 inch along the length of the groove depending on the particular information recorded therein, so that the regions of the surface of the record between adjacent convolutions of the groove will vary in width from about 0.0035 inch to about 0.005 inch.

The smallness of the mentioned parameters begins to suggest the degree of precision that is required for optical sensing of information recorded in the form of undulations along the groove of a phonograph record. For accurate reproduction of audio information, the sensor needs to be capable of responding to the recorded information in increments not significantly exceeding one-half cycle of the highest frequencies to be reproduced. Since a 20 KHz audio frequency is typically represented in a phonograph record by undulations having a half cycle dimension along the length of the groove of only about 0.0004 inch or less, it will be apparent that a satisfactory optical sensor must be capable of isolating the light or other radiation reflections from only a very minute portion of the record at any given time, which in turn implies the need to employ as the optical component for receiving the reflected light a microscope or the like having equivalent powers of resolution. I have found that to achieve truly high fidelity reproduction of music by optical techniques from an ordinary phonograph record, it is necessary to maintain the microscope or other equivalent reflected radiation receiving component focused on the area of the record being sensed with a precision of less than plus or minus 0.001 inch of the optimumly focused spacing.

Although the precision required in groove tracking is somewhat less demanding than for maintaining proper height or spacing of the reflected radiation receiving component from the record areas being sensed, both require a high degree of accuracy. Moreover, remembering that the record will be continually rotating relative to the optical sensing unit at typically 33 or 45 R.P.M., it will also be clear that the means employed for maintaining both groove tracking and focusing spacing (and especially the latter since repositioning of the sensing unit to accommodate to warpage of the record or the like may be required in either direction and with considerable randomness) must be capable of reacting quite quickly, as well as with great precision.

Another aspect of the characteristics of ordinary phonograph records deserves preliminary comment. The flat surface regions between adjacent convolutions of the recording groove are substantially flat, have the property of being relatively efficient in reflecting light or similar radiations, and the further desirable property of reflecting such radiations at an angle opposite to but substantially corresponding in magnitude to the angle of incidence at which the radiations were directed onto such surface regions and without undue dispersion. On the other hand, I have found that, as to light or similar radiations directed into the recording groove at a given angle of incidence to the surface of the record for the sensing of reflected portions thereof at an opposite but comparable angle to such surface, the effective reflectivity of the groove is much less than that of the adjacent surface regions of the record, due to dispersion and the effects of angularity and undulation of the side walls of the groove. These factors render it difficult to comprehend why prior efforts to optically sense information recorded in ordinary phonograph records have concentrated upon attempting to sense the information-representing undulations from light reflected from the side walls of the recording groove itself.

In any event, I have found that the information-bearing undulations to be sensed are at least as sharply defined at the boundaries of intersection of the groove with the adjacent regions on the surface of the record as they are by the side wall surfaces within the groove itself. Indeed, with records that have already been subjected to some groove wear from the employment of some kinds of "needle" type pick-ups therewith, the information-bearing undulations will remain significantly better defined at the intersecting boundaries of the groove with the record surface than along the side walls within the groove.

Consequently, this invention senses the information-bearing undulations at the surface of the record and with reference to the undulating boundaries between the relatively reflective surface regions laterally adjacent the groove and the intersecting edges of the effectively much less reflective side walls of the groove.

Referring now initially to FIGS. 3 and 4 of the drawings, a conventional phonograph record 10 having a major information carrying surface and a central alignment hole is adapted to be supported for rotation upon a turntable 12 typically having a record protecting upper surface and an upstanding central pin 14. The turntable 12 is in turn rotatably mounted on a base 16 and adapted to be rotated at appropriate speed by a motor (not shown) housed within the base 16.

A tone arm carrying assembly 18 having a pair of spaced side members 20 and 22 rigidly interconnected by rods 24 and 26 is mounted on the base 16 in any suitable fashion, such as upon a guide track 28 and a support track 30 on the base 16, for reciprocal movement along a linear horizontal path to one side of the turntable 12. A lead screw 32 extending parallel to the path of the assembly 18 is rotatably mounted on the base 16 by suitable bearing bracket means as at 34 and is coupled with a sensitive, reversible, electric, servo motor 36 adapted to precisely rotate the lead screw 32 in response to electrical control signals hereafter identified. A follower nut 38 rides on the lead screw 32 and is secured to an extension of the member 22 of the assembly 18 for moving the latter along its path in response to operation of the motor 36.

A tone arm assembly 40 is rockably mounted on the carrying assembly 18 by a knife-edge support 42 for limited pivoting of the assembly 40 about a horizontal axis parallel to the path of linear movement of the carrying assembly 18. A radiation source unit 44 and parts of an optical sensing unit 46 are carried on opaque tubes 48 and 50 extending from a housing portion 52 of the assembly 40 to positions in spaced overlying relationship to the record 10. The configuration of the tubes 48 and 50 is somewhat idealized in the drawings for clarity of illustration, and those skilled in the art will understand that conventional use of mirrors or other optically appropriate components will permit the tubes 48 and 50 and the optical paths therewithin to be arranged in a variety of configurations to satisfy optical path dimensional parameters, provide for convenient location of components of the sensing unit 46 or conform to other preferences; it is noted, however, that the chosen configuration of the tubes 48 and 50 should provide for the mounting of the source unit 44 and the sensing unit 46 in such manner that radiations from the source unit 44 will be directed toward an area of the surface of the record 10 shiftably disposed along a line through the center of the record 10 and parallel to the path of movement of the assemblies 18 and 40, with such radiations approaching such area with a preferably acute angle of incidence to the surface of the record 10 and along an optical path generally parallel to the vertical plane tangent to a convolution of the recording groove of the record passing centrally through the radiated area, and also in such manner that radiations reflected from the mentioned area of the surface of the record 10 at the mentioned angle of incidence therewith will be received by the sensing unit 46 along an optical path leaving the record surface at an angle opposite to but of magnitude similar to the angle of incidence from which the radiations are directed onto the area of the record 10 to be sensed from the source unit 44.

Thus, it will be perceived that the source unit 44 and the sensing unit 46 are so supported by the assembly 40 that the optical path from the source unit 44 toward the area of the record 10 to be sensed and the optical path of reflection toward the sensing unit 46 intersect at a level spaced below the extremities of the units 44 and 46 by some predetermined distance primarily determined by the angle between such optical paths and, therefore, by the relative positioning of the units 44 and 46 upon the assembly 40, my preference being for approximately a right angle between the mentioned optical paths, which results in angles of incidence to and reflection from the area of the record 10 to be sensed of approximately 45 degrees for each. Perhaps even more significantly, it should be recognized that, with the relative positions of the units 44 and 46, the directions of and angle between their respective optical paths and the level or spacing of the intersection of such optical paths relative to the units 44 and 46 thus determined, and since the sensing unit 46 will preferably be adjusted to optimumly focus at some predetermined distance therefrom along the optical path from which it receives reflected radiations chosen to coincide with the intersection of the mentioned optical paths, the height or spacing at which the source unit 44 and the sensing unit 46 must be juxtaposed relative to the level of an area of the record 10 to be sensed in order for the sensing unit 46 to be optimumly focused on such area is critical to precision reproduction of information carried by the record 10. Such height or spacing must be accurately maintained on a continuing basis despite warpage of the record 10 and the various other factors typically encountered and which effectively vary the level of the areas of the record 10 being momentarily and successively sensed.

Presuming that the lengths of the optical path tubes 48 and 40 will be constructed to appropriately locate the intersection of the optical paths associated with the source unit 44 and the sensing unit 46, the swingable mounting of the carrier assembly 40 will adequately provide substantially vertical adjustability of the height or spacing of such intersection relative to the area of the record 10 being sensed, particularly since the angular range of rocking of the tone arm assembly 40 required for such adjustment will be quite minute. It will be understood that the tubes 48 and 50 and the housing 52 may be configured to accommodate various optical path defining components and the sensors and components of the sensing unit 46, hereinafter further identified, and for such purpose the housing 52 may be provided with increased space by a lateral extension 56. To facilitate continuing rocking adjustment of the tone arm assembly 40 relative to the record 10 as the latter is being "played", the entire assembly 40 will preferably be constructed and counter-weighted, if necessary, so that it substantially balances upon the pivotal axis provided by the knife-edge mounting 42.

An electrically responsive device 54 is utilized to control the rocking adjustment of the tone arm assembly 40 and, thereby, the height of the source unit 44 and sensing unit 46 above the surface of the record 10 and the positioning of the intersection of the optical paths associated with the units 44 and 46 at a level substantially coinciding with the level of the area of the record 10 momentarily being sensed. I prefer to employ for the device 54 a sensitive voice coil component having a relatively large magnet for stability purposes, with one of the relatively reciprocable elements of such device 54 mounted on an extension 58 of the assembly 18 and the other of its movable elements secured to a lower face of an extension 60 of the assembly 40 on the opposite side of the pivotal mounting 42 from the source and sensing units 44 and 46. Others might desire to design and utilize a vertically reciprocable mounting for the assembly 40 upon the assembly 18 or/and to employ a lead screw arrangement driven by a sensitive servo motor instead of the construction described; however, I strongly prefer the rockable mounting shown and described and the use of a voice coil like component for the electrically responsive adjusting device 54, both by virtue of their simplicity and low cost and because I have found that construction to be both highly accurate and quickly responsive. It should probably also be observed that many of the mechanical aspects of my apparatus thus far described are subject to considerable modification as to constructional details, as long as equivalent relationship and those functional restraints herein indicated to be critical are maintained.

Reference is next made to FIGS. 1, 2 and 5, wherein the primary optical components, paths and relationships are schematically depicted in greater detail.

The radiation source unit 44 broadly includes a radiation source 62, collimating lenses 64 and 66, an opaque plate 68 provided with a preferably rectangular slit 70, and a slit focusing objective lens 72.

Although optically responsive radiations of other types or wave lengths might be employed, I have found radiations of ordinary light of visible wave lengths to be quite satisfactory and most economical to provide. Accordingly, my preferred radiation source 62 is simply a small, intense, appropriately mounted and energized incandescent lamp bulb of conventional type.

The collimating lenses 64 and 66 are of conventional type for gathering light from the source 62 and guiding the same toward the back side of the apertured plate 68, and particularly the slit 70 therein in known manner.

The apertured plate 68 is for the purpose of defining an area of the record surface (indicated by the solid line 74 in FIG. 1) to be sensed onto which illumination from the source 62 may be concentrated. Although a slit or aperture 70 of proper symmetry but other shape could probably be employed, I prefer for the slit to be generally rectangular, of a width of about 0.010 inch, and of length appropriate for illuminating a sufficient area of the record surface 74 to laterally traverse a short longitudinal stretch of the recording groove and a significant part of the laterally adjacent regions on opposite sides of such stretch of the groove. The manner in which such area of illumination relates to the several optical sensing functions performed by the invention will be hereinafter further explained. It should be observed in passing, however, that an equivalent definition of the area of the record 10 to be sensed might be accomplished in some applications either by associating the apertured plate with the sensing unit 46 or even by relying upon the extent of the focused field of reception of reflected light by the sensing unit 46 to define the area of the surface 74 of a record 10 or other object being sensed; however, for the illustrative application of the invention primarily referred to in this description, I prefer both to utilize the apertured plate 68 described and to associate it with the source unit 44.

To assure that light from the source 62 passing through the slit 70 will be efficiently concentrated to illuminate the area of the record surface 74 to be sensed, I prefer to include in the source unit 44 the slit focusing objective lens 72, which may be of conventional character and functions in known manner to focus an illuminated image of the configuration defined by the slit 70 upon the area of the record surface 74 to be sensed.

FIG. 5 may help to clarify the general relationship to the record 10 of the illumination provided by the source unit 44. In that figure, a portion of the information-carrying face of the record is fragmentarily depicted at 10', and the general plane of the surface of such face is again indicated by the reference numeral 74. An information-carrying groove of the record 10 is indicated at 76 and has undulating, information-representing top edges 78 and 80 presenting intersecting boundaries with the plane of regions 82 and 84 of the surface 74 laterally adjacent the groove 76 on opposite sides of the latter. The rectangular area illuminated by the source means 44 and by the focused image of the slit 70 is generally indicated at 85 and will be seen to laterally traverse a short longitudinal stretch 86 of the groove 76 and to extend laterally on both sides of the stretch 86 onto illuminated regions 88 and 90 of the record surface 74. The regions 88 and 90 are cross-hatched in FIG. 5 to indicate that light is being reflected therefrom, while the side wall portions of the groove 76 are left white to indicate the lack of significant reflection therefrom along the optical path from which reflected light will be received by the sensing unit 46. Before leaving FIG. 5, it may be noted that the dotted circular line 92 therein is intended to generally represent the focused field from which reflected light would be efficiently picked up by the sensing unit 46.

Returning attention to FIGS. 1 and 2, the sensing unit 46 broadly includes an objective lens 94 and a projection lens 96 together presenting essentially a conventional type projection microscope optical arrangement, a pair of mirrors 98 and 100 having a gap 102 between their adjacent edges, a pair of collector lenses 104 and 106, a too low photoelectric sensor 108, a too high photoelectric sensor 110, a further projection lens 112, a pair of mirrors 114 and 116, a pair of further collector lenses 118 and 120, a right photoelectric sensor 122, and a left photoelectric sensor 124.

As previously indicated the lenses 94 and 96 function in known manner as what amounts to a projection microscope having a focused field (as at 92 in FIG. 5), which needs to be accurately focused upon the surface 74 of the record 10 for accurately projecting toward the mirrors 98 and 100 and via the gap 102 toward the mirrors 114 and 116 appropriate components of whatever light is reflected from the illuminated area 85 of the record surface 74 (which, as previously noted, will in the preferred embodiment be that light reflected from the illuminated regions 88 and 90 laterally adjacent to the groove stretch 86, rather than significantly from the latter by virtue of its considerably lower reflectivity property for reflecting light into the optical path of the projection microscope 94–96, as compared with the regions 88 and 90).

The microscope 94–96 projects respective components of the light reflected from the area 85 onto each of the mirrors 98 and 100 and also through the gap 102 between the latter onto the mirrors 114 and 116 via the lens 112. Although it would be virtually impossible to accurately depict in FIGS. 1 and 2 the paths of all light rays within the various optical paths included in the apparatus, an attempt has been made in those figures to generally indicate sufficient portions of the various light paths to permit understanding of the description of the functioning of the various optical components.

The mirrors 98 and 100 may be of any conventional type providing suitable reflecting surfaces. They, in conjunction with the gap 102 therebetween (which may be physical, as I prefer, or provided optically), serve two primary purposes. First, the mirrors 98 and 100 respectively split out from the overall beam of reflected light being projected from the microscope 94–96 a too low component and a too high component, which they respectively reflect and redirect toward the two low sensor 108 and the too high sensor 110 via the collecting lenses 104 and 106 respectively. In this context, "too low" and "too high" will be understood as referring to the height or spacing of the lens 72 of the source unit 44 and the lens 94 of the sensing unit 46 and the intersection of their optical paths relative to the proper disposition thereof for optimumly focusing upon the regions 88 and 90 of the record surface 74 within the area 85. Secondly, the mirrors serve as masks for defining the gap 102 therebetween so as to effectively pass through the latter only components of light reflected from a central, longitudinal section of the area 85 (which includes "too far left" and "too far right" components, in a groove tracking sense, but from which the "too low" and "too high" components reflected from opposite, outer, longitudinal sections of the area 85 will have been effectively "stripped" for redirection to the too low and too high sensors 108 and 110). This will be hereinafter further explained with reference to FIG. 6. It is significant to note both that the mirrors 98 and 100 have their reflecting surfaces angularly inclined to each other (the angle being selectable to accommodate to the locations of other optical components and light paths chosen for mechanical arrangement purposes), and that the longitudinal axis of the gap 102 and the axis about which the mirrors 108 and 110 are tilted extend horizontally.

The collector lenses 104 and 106 serve to more effectively gather and direct light components being reflected by the mirrors 98 and 100 respectively onto the sensors 108 and 110 respectively in known manner.

The light responsive sensors 108 and 110 serve to convert the intensity of the reflected light components applied thereto into corresponding electrical signals or parameters, which are then utilized for control purposes by the electrical portion of the apparatus hereinafter described (although it may be correctly surmised at this point that, if the intensity of reflected light being applied to the too low sensor 108 exceeds the intensity of reflected light being concurrently applied to the too high sensor 110, a control signal will be produced and applied to the voice coil device 54 for swinging the tone arm assembly 40 to appropriately raise the source unit 44 and sensing unit 46 relative to the record surface 74, and vice versa).

The lens 12 serves to project the reflected light components passing through the gap 102 onto the mirrors 114 and 116 in known manner.

The mirrors 114 and 116 are inclined to each other (conveniently at an angle of about 90 degrees) with their axis of tilt significantly being perpendicular to a plane through the axis of tilt of the mirrors 98 and 100. The mirrors 114 and 116, whose adjacent edges are preferably contiguous, effectively split the reflected light from the gap 102 and lens 112 into a "too far left" component to be further reflected from the mirror 114 and a "too far right" component to be further reflected from the mirror 116.

The collector lens 118 receives light reflected from the mirror 114 and representing a too far left component and focuses the same upon the too far left sensor 122, while the collector lens 120 performs a similar function with respect to focusing upon the too far right sensor 124 the corresponding light component reflected from the mirror 116. Although such matter will be more clear from the further explanation hereinafter with reference to FIG. 6, what I have referred to as the "too far left" and "too far right" components are both of continuing interest and are continually sensed by the respective sensors 122 and 124, both because the difference in their relative intensities is utilized to control the speed of the groove tracking servo motor 36 and because the light intensities respectively sensed by the sensors 122 and 124 are also utilized to provide electrical outputs of the audio or other information recorded in the form of undulations or lateral displacements in the boundaries 78 and 80 between the stretch 86 of the groove 76 and the laterally adjacent regions 88 and 90. Such components, which have both groove tracking significance and information bearing significance, are, of course, respectively derived from the light reflected from the right and left portions of only the previously mentioned central, longitudinally extending section of the area 85 being sensed, so that the information representing content thereof will be responsive to the effects of undulations of length corresponding to no more than about one-half cycle of the recorded audio information at the highest frequency at which such information is to be reproduced. Again, this should become more clear from subsequent discussion of the functioning of the invention with reference to FIG. 6. Although the sensitivity of photodarlington transistors has been found quite adequate for implementing the too low and too high sensors 108 and 110, and may also be adequate to serve in less demanding applications for implementing the too far left and too far right sensors 122 and 124, by virtue of desiring to optimize the fidelity of reproduction of music and audio information, in my embodiment for that application I prefer to utilize photo multiplier tubes for the sensors 122 and 124 in order to take advantage of their even greater sensitivity.

Before considering the subject of operation in greater detail, however, it will first be appropriate to consider the general manner of utilization of the electrical signals or parameters produced by the sensors 108, 110, 122 and 124 and the electrical portions of the apparatus provided for that purpose. Reference is next made, therefore, to FIG. 7, wherein the electrical portions of the apparatus have been depicted in block diagram form since the electronic details thereof may be implemented in a variety of manners known to those skilled in the art, so that it should be sufficient for purposes of adequately describing the present invention to identify the electrical modules employed and their functions and intercouplings, without reference to the particular, low level components which might be employed. As seen in FIG. 7, the electrical outputs of the too high sensor 110 and the too low sensor 108 are respectively fed to amplifiers 126 and 128, whose outputs are in turn fed to a voltage difference deriving circuit 130, such as a comparator, whose electrical output in turn is used as a control signal fed to the voice coil or equivalent device 54 employed for continually adjusting the rockable positioning of the tone arm assembly 40 to maintain the lens 72 of the source unit 44 and the microscope 94–96 in optimumly spaced and focused relationship with the area 85 of the record 10 being sensed. Similarly, the electrical outputs from the photo multiplier tube sensors 124 and 122 are respectively fed to amplifiers 130 and 132. The electrical output from the amplifier 130 is electrically split to feed both a high pass filter 134 and a low pass filter 136. The low pass filter 136 may be designed to pass only electrical signal components from the output of the amplifier 130 that are below the lowest frequency of interest for audio or other information reproducing purposes, while the filter 134 may be designed to pass all electrical signal components from the output of the amplifier 130 which are higher than those passed by the filter 136 and which are within a range of frequencies of interest in connection with the particular information to be reproduced. In like manner, the electrical output from the amplifier 132 is electrically split and fed both to a low pass filter 138 and a high pass filter 140 having characteristics similar to the filters 134 and 136. The electrical signals passed by the high pass filters 134 and 140 respectively, are fed as information bearing signals to whatever utilization means 142 and 144 respectively are involved in the particular application being served. The signal fed to the utilization means 142 is representative of the information sensed from the right boundary 80 between the groove stretch 86 and the adjacent region 90 being sensed, while the signal fed to the utilization means 144 is representative of information sensed from the left boundary 78 between the stretch 86 of the groove 76 and the adjacent region 88. In the application chosen for illustration involving the reproduction of music or other audio information recorded in an ordinary phonograph record, the utilization means 142 and 144 may be understood as typically comprising right and left audio channels of a stereo type audio reproduction system normally including means for further amplification of the signals, loud speakers and the like. In an application of the invention to the reproduction of monaural audio information from an ordinary phonograph record, the information bearing undulations along the boundaries 78 and 80 within the area 85 will have reversed but substantially identical symmetry, so that the utilization means 142 and 144 would both be receiving substantially identical information bearing signals permitting one of such means 142 and 144 to be omitted, if desired. The electrical outputs from the low pass filters 136 and 138 are fed to a voltage difference deriving circuit 146, such as a comparator, whose electrical output is in the nature of a control signal to be used in any appropriate and known fashion for controlling the speed at which the servo motor 36 rotates the lead screw 32 to maintain tracking with the groove 76 of the record as the latter rotates and successive convolutions of the groove 76 are to be subjected to sensing. It should be observed that various mundane adjuncts to the primary electrical portions of the apparatus depicted in FIG. 7 will naturally be included in the apparatus by those skilled in the art, for example, suitable electric power circuits, switches for activating and deactivating the latter, suitable means for reversing the energization of the groove tracking servo motor 36 to return the tone arm assembly 40 to its normal starting position for "playing" a next record 10, etc.

Reference is next made to the chart contained in FIG. 6, from which a number of the more detailed aspects of my method and the operation of my preferred apparatus for practicing such method should be further clarified. The first row of blocks 1A, 1B, 1C, 1D and 1E depict the reflected light patterns at various components or points of the involved optical paths when the tone arm assembly 40 is both at the proper height or spacing relative to the surface 74 of the record 10 and properly centered in tracking relationship relative to a particular groove stretch 86 being subjected to sensing. As in FIG. 5, cross-hatched sections represent reflected light, and white sections represent a lack or significantly reduced intensity of reflected light. Block 1A depicts the light image projected upon the mirrors 98 and 100 under the mentioned equilibrium conditions, in which the rectangle 185 corresponds to the overall pattern of reflected light received via the microscope 94–96 from the area 85 of the record 10, and the portions 186, 188 and 190 correspond respectively to the groove stretch 86 and the regions 88 and 90 of FIG. 5. The dotted lines 196 and 198 in block 1A (and also in blocks 2A, 3A, 4A and 5A) delineate the bounds of reflected light components passed through the gap 102 between the mirrors 98 and 100. The horizontal alignment in the columns suffixed B, C, D and E of the chart with the corresponding sections of the overall image pattern shown in the column suffixed A in the corresponding row show the particular light images appearing at various points of the apparatus under various conditions. Indeed, the labelling of the various columns of the chart of FIG. 6 with indications of the component of the apparatus for which the presented light image is depicted and the similar labelling of the rows of the chart prefixed 2, 3, 4 and 5 with indications of the particular temporary "error signal" condition to be automatically corrected for by the invention and for which the applicable light image is depicted should render the entire chart essentially self-explanatory to those skilled in the art or who have followed the preceding description and explanations of the various parts and aspects of the invention.

It also appears that the method aspects of the invention have been amply treated or made apparent during the course of discussion of the manner in which the method would be implemented by means of the preferred apparatus that has been described for that purpose in the context of the application of "playing" an ordinary phonograph record. Accordingly, those matters would not appear to require further discussion or explanation.

It may be appropriate, however, to briefly reemphasize two aspects of the invention which appear to me to contribute, perhaps most significantly, to the reliable accomplishment by the invention of a result inherently requiring high precision and long unsuccessfully sought by others by means of techniques and apparatus that are relatively simple, economical and practical to implement and quite effective and reliable in operation. The first of those aspects of the invention believed to deserve particular note is the employment of purely optical means for accurately and continuously controlling the height or spacing juxtaposition of the sensing elements relative to the surface of the record or object from which information is being sensed, in order to eliminate any need for physical engagement with the information carrying portions of the record or object being sensed (as had apparently heretofore come to be accepted as an inevitable requirement in prior systems for similar purposes), while actually maintaining an accuracy of continuing automatic adjustment of such juxtapositioning far greater than could possibly be attained with the use of a stylus, roller or other height controlling structure in mechanical engagement with the surface of the record or object from which information is to be sensed. Secondly, considerable simplification, economy and accuracy is imparted to the invention by the fact that it requires only a single source beam of light or other optically responsive radiations and only a single beam of reflected light being received from the area of the record or object being sensed, in order to perform not only the desired information function and the basic groove tracking function, but also the height juxtapositioning function, to the attainment of which result the employment of two pairs of beam splitting mirrors with a gap between the mirrors of one pair and the dual utilization of the same pair of sensors for sensing both right and left tracking control information and the primary recorded information to be retrieved from both of the information carrying boundaries of the recording groove are believed to have significantly contributed.

Although other applications for the invention and various modifications of certain of its details, in connection with which the principles and essence of the invention might equivalently be employed to enjoy the advantages it achieves, will likely become apparent to those skilled in the art from what has already been disclosed, a few further examples of apparently feasible variations in implementation or application of the invention may tend to facilitate its fullest utilization. It has been mentioned that the recorded information to be sensed could be of a character other than music or other audio material, for instance, digital data in some appropriately encoded form. One manner of encoding digital type data would appear to be to employ a different characteristic tone of frequency of undulations for each digit involved in the encoding system in which the data is represented, in which regard it should be observed that it should be feasible to easily handle decimally or other multivalue encoded data with the same facility as binary encoded data. Another possibility for applying the invention to digital type data, particularly that of binary type, would be to record the information to be sensed in the form of the presence or absence of successive, rectangular, lateral displacements along the boundaries of a recording groove, instead of the sinuous undulations characteristic of conventional recording of audio information. Although the invention has been explained in terms of ordinary disc like records, it will be apparent that it could be applied to records in the form of a strip-like medium, in which case appropriate means for moving that type of medium past the radiation source and sensing units would need to be substituted for the rotational relative movement provided by a turntable. Similarly, although the invention has been explained with reference to information recorded in a grooved medium, it should be apparent that the invention should also be applicable to an information carrying medium in which the recording information is represented by undulations along the edges of a flat strip or coating carried upon a medium or object having a more reflective background, or with appropriate changes in the electrical generation of control signals and their utilization which would appear clearly within the skill of the art, to such a system in which the relative reflectivity properties of the strip-like information carrying zone and the background regions adjacent thereto are reversed. Finally, it is suggested that the aspect of the invention concerned with providing automatic height control and tracking might well be employed in applications where no retrieval of recorded information is involved and where only the spacing and tracking controlling functions are required, in which types of application scribing an appropriate configured groove on the workpiece or applying a strip or coating of different reflective properties than the adjacent regions of the workpiece would seem likely to be feasible.

In view of the apparently basic and significant character of this invention, it is intended that the claims which follow should be liberally construed to encompass minor variations not departing from the gist of the invention and a fair range of equivalents as to both structure and application.

I claim:

1. In apparatus for sensing information recorded on a medium in the form of lateral displacements along the length of at least one of the boundaries between an elongate zone of said medium having particular properties with respect to reflecting light radiations and regions of said medium laterally adjacent said zone having different properties than said zone with respect to reflecting light radiations, wherein said apparatus includes:

pickup means, including means for directing light radiations along a transmission path, means for receiving light radiations along a collection path, and means for mounting said directing means and said receiving means in positions relative to each other for angularly converging intersection of said transmission and collection paths, said intersection defining a locale in spaced relationship to said pickup means within which substantially optimized reflection of light radiations from said transmission path to said collection path can occur;

support means for respectively supporting said pickup means and said medium for relative movement therebetween, said pickup means and said medium being relatively movable in a translational sense along the length of said zone of said medium for directing light radiations in said transmission path successively toward a plurality of portions of said medium disposed along the length of said zone and each including a longitudinal stretch of said zone and parts of said regions laterally adjacent to said stretch, said pickup means and said medium also being relatively movable in a spacing sense toward and away from each other for altering the positioning of said locale relative to coincidence with the portion of said medium toward which light radiations in said transmission path are being directed, said pickup means and said medium also being relatively movable in a tracking sense transversely to the length of said zone of said medium for altering the positioning of said portion of said medium toward which light radiations in said transmission path are being directed relative to laterally centered relationship with said zone of said medium;

drive means operably coupled with said support means for producing relative movement between said pickup means and said medium in said translational sense along the length of said zone of said medium;

spacing adjusting means operably coupled with said support means for producing relative movement between said pickup means and said medium in said spacing sense toward or away from each other; and tracking adjusting means operably coupled with said support means for producing relative movement between said pickup means and said medium in said tracking sense transversely to the length of said zone of said medium;

the improvement of which apparatus comprises means for controlling the spacing and tracking of said pickup means relative to said medium without any necessity for mechanical engagement between relatively moving parts of said apparatus and said medium, said controlling means including:

spacing sensing means operably associated with said receiving means, responsive to light radiations and disposed to receive a first pair of components of light radiations being reflected along said collection path from different sections of said portion of said medium toward which light radiations in said transmission path are being directed for producing spacing signals corresponding in a predetermined manner to said first pair of light radiation components being respectively reflected from said sections of said portion of said medium, said spacing sensing means including a pair of spacing sensors, said first pair of components of light radiations received by said spacing sensing means being respectively reflected along said collection path from a pair of sections of said portion of said medium toward which said radiations in said transmission path are directed that are offset from each other in the general direction of the length of said zone of said medium and being respectively applied to said spacing sensors; a first pair of angularly offset mirrors in operable association with said collection path disposed for separating said first pair of radiation components reflected from said sections from each other and further reflecting the same respectively toward said spacing sensors;

means for operably coupling said spacing sensing means with said spacing adjusting means for operating the latter in accordance with said spacing signals to relatively move said pickup means and said medium in said spacing sense toward and away from each other as required to maintain said locale within which substantially optimized reflection of light radiations from said transmission path to said collection path can occur in substantial coincidence with said portion of said medium toward which light radiations in said transmission path are being directed;

tracking sensing means operably associated with said receiving means, responsive to light radiations and disposed to receive a second pair of components of light radiations being reflected along said collection path from different segments of said portion of said medium toward which light radiations in said transmission path are being directed for producing tracking signals corresponding in a predetermined way to said second pair of light radiation components being respectively reflected from said segments of said portion of said medium, said tracking sensing means including a pair of tracking sensors, said second pair of components of light radiations received by said tracking sensing means being respectively reflected along said collection path from a pair of segments of said portion of said medium toward which said radiations in said transmission path are directed that are offset from each other in a direction generally transverse to the length of said zone of said medium and being respectively applied to said tracking sensors;

means for operably coupling said tracking sensing means with said tracking adjusting means for operating the latter in accordance with said tracking signals to relatively move said pickup means and said medium in said tracking sense transversely to the length of said zone of said medium as required to maintain the positioning of said portion of said medium toward which light radiations in said transmission path are being directed in substantially laterally centered relationship with said zone of said medium;

a second pair of angularly offset mirrors in operable association with said collection path disposed for separating said second pair of radiation components reflected from said segments from each other and further reflecting the same respectively toward said tracking sensors; and information sensing means operably associated with said receiving means, responsive to light radiations and disposed to receive at least a third component of light radiations being reflected along said collection path from at least one part of said portion of said medium toward which light radiations in said transmission path are being directed for producing information signals corresponding in a predetermined fashion to said recorded information to be sensed from said medium.

2. Apparatus according to claim 1, wherein:
the adjacent extremities of one of said pairs of mirrors are spaced from each other to provide a gap for passage there-between of radiation components other than those applied to the corresponding one of said sensing means; and said other radiation components passed by said gap are directed toward the other of said pairs of mirrors for application to the sensing means associated therewith.

3. Apparatus according to claim 2, wherein:
at least one of said tracking sensors is utilized as a part of said information sensing means.

4. Apparatus according to claim 1, wherein:
the line of convergence between said first pair of angularly offset mirrors and the line of convergence between said second pair of angularly offset mirrors are respectively disposed in substantially mutually perpendicular planes.

5. Apparatus according to claim 1, wherein:
each of said sensing means includes photosensitive means for controlling the production of electrical signals correlated in magnitude with the amounts of reflected light applied thereto;

said photosensitive means for said spacing sensing means includes a first pair of photoelectric sensors;

said means for operably coupling said spacing sensing means with said spacing adjusting means includes first electrical circuit means electrically coupled with said first pair of photoelectric sensors and with said spacing adjusting means for applying to the latter electrical control signals correlated in a predetermined manner with the difference in the amounts of light respectively applied to said first pair of photoelectric sensors;

said photosensitive means for said tracking sensing means includes a second pair of photoelectric sensors; and said means for operably coupling said tracking sensing means with said tracking adjusting means includes second electrical circuit means electrically coupled with said second pair of photoelectric sensors and with said tracking adjusting means and having electrical filtering means operable to separate electrical signals from said second pair of photoelectric sensors corresponding to the amounts of light respectively applied to the latter into higher and lower frequency electrical components for applying to the said tracking adjusting means electrical control signals correlated in a predetermined way with the lower frequency electrical components of said electrical signals from said second pair of photoelectric sensors.

6. Apparatus according to claim 5, wherein:
at least one of said second pair of photoelectric sensors and said electrical filtering means associated therewith serve as a part of said information sensing means, the recorded information sensed by said information sensing means being correlated in a predetermined fashion with said higher frequency electrical components.

* * * * *